(12) United States Patent
Perry (10) Patent No.: US 7,159,190 B2
(45) Date of Patent: Jan. 2, 2007

(54) SYSTEMS AND METHODS FOR NAVIGATING AND DISPLAYING PRINT JOB EXCEPTION INFORMATION IN A PRINTER SYSTEM

(75) Inventor: Thomas J. Perry, Pittsford, NY (US)

(73) Assignee: Xerox Corporation, Stamford, CT (US)

(*) Notice: Subject to any disclaimer, the term of this patent is extended or adjusted under 35 U.S.C. 154(b) by 758 days.

(21) Appl. No.: 10/238,739

(22) Filed: Sep. 11, 2002

(65) Prior Publication Data

US 2004/0046797 A1 Mar. 11, 2004

(51) Int. Cl.
*G06F 13/10* (2006.01)
*G06F 3/01* (2006.01)

(52) U.S. Cl. .................. 715/825; 715/777; 715/804; 399/81; 399/82

(58) Field of Classification Search .............. 715/527, 715/525, 777, 811, 824, 823, 825, 838, 749, 715/760, 810, 804; 399/82, 81; 358/1.9
See application file for complete search history.

(56) References Cited

U.S. PATENT DOCUMENTS

| | | | | |
|---|---|---|---|---|
| 5,133,048 A | * | 7/1992 | Parsons et al. ............ 358/1.12 |
| 5,614,993 A | * | 3/1997 | Smith et al. .................. 399/81 |
| 6,100,994 A | * | 8/2000 | Schliekelmann et al. .. 358/1.15 |
| 6,462,756 B1 | * | 10/2002 | Hansen et al. .............. 715/764 |
| 6,493,006 B1 | * | 12/2002 | Gourdol et al. ............. 715/825 |
| 6,515,684 B1 | * | 2/2003 | Knodt ......................... 715/777 |
| 6,621,590 B1 | * | 9/2003 | Livingston ................. 358/1.15 |
| 6,628,311 B1 | * | 9/2003 | Fang .......................... 715/777 |

* cited by examiner

Primary Examiner—Tadesse Hailu
Assistant Examiner—Blaine Basom
(74) Attorney, Agent, or Firm—Oliff & Berridge, PLC (57) ABSTRACT

A printer system can be used for displaying and printing a print job, the print job including at least print job level properties and print job exception attributes. The printer system can include a display device that displays the print job, a memory that stores the print job and a controller that controls the print job displayed on the display device to display only the print job exception attributes of the print job that are different from the print job level properties. Moreover, a graphic user interface can be used for displaying a print job and can be used with a printer system. The graphic user interface can include a first window that displays the print job level properties of the print job and a second window that displays only the print job exception attributes of the print job that are different from the print job level properties.

20 Claims, 8 Drawing Sheets

SYSTEMS AND METHODS FOR NAVIGATING AND DISPLAYING PRINT JOB EXCEPTION INFORMATION IN A PRINTER SYSTEM

BACKGROUND OF THE INVENTION

1. Field of Invention

The present invention relates to printer systems and methods.

2. Description of Related Art

Currently, printer systems are used in a wide variety of fields. For example, printer systems are used extensively on networks in a client/server environment for printing information forwarded from a remote terminal such as a computer. Printer systems are also used in a distributed network environment or with a stand-alone computer.

When a user desires to print information using the printer system, for example, the user generally programs a print job to include default or customized properties and attributes prior to printing. Then, the user controls the computer to send a print command to the printer system to print the information through the printing system. The print information can be the print job that includes print job parameters, print job attributes and other types of information along with the actual image to be printed. The printer system can use windows type software that typically includes various pages for displaying the print job parameters, attributes and other information so that the user can accept or modify the information prior to printing.

For example, the user can display a window showing job parameters that will be applied to an entire print job such a print job number and various types of paper stock to be used for the printing. Moreover, the user can display another window showing exception pages that display page level exceptions programming that describe the print job exception attributes to be applied to a portion of the entire print job, i.e., special pages in the print job. The attributes are "exceptions" to the properties that have been programmed at the job level, and can be created and edited by users in each printing production environment.

In conventional monochrome printer systems, the print job parameters can be displayed so that certain print job exception attributes of a print job can be shown on the exception pages. Examples of these print job exception attributes that can be shown on the exception pages are paper size, color and paper weight. Because monochrome printing does not involve the numerous job parameters associated with color printing, there is generally an adequate amount of space on the exception pages to display all of the desired print job exception attributes. However, color printing involves many more job parameters than monochrome printing and has exponentially increased the number of print job parameters and print job exception attributes available for a print job and page level exceptions programming. Likewise, there are many more print job exception attributes that can be controlled prior to printing, resulting in the exception page editing being a much larger task than in monochrome systems.

Thus, there is a need for printer systems and methods that allow a user to improve the management of numerous print job exception attributes on the exception pages in order to increase worker productivity and reduce page level exceptions programming errors. Moreover, systems and methods that improve exception page management by reducing redundant print job exceptions attributes that are displayed will eliminate a need for a user to horizontally scroll down a page to summarize the print job exceptions attributes on the exception pages.

SUMMARY OF THE INVENTION

The invention provides printer systems and methods that more efficiently display print job exceptions attributes on an exception page window.

The invention further provides printer systems and methods that can be used with any printer software that supports programming of selected print job pages with different print job attributes from the job level programming.

The invention separately provides printer systems and methods that eliminate a need for a user to horizontally scroll through a displayed page in order for the user to view all of the print job exceptions attributes on a selected exception page.

The invention separately provides printer systems and methods that allow a user to navigate by hot-linking from a selected item on the exception pages to related properties or settings on various other pages.

The invention further provides printer systems and methods that allows a user to add new print job exceptions attributes during page level exceptions programming that can be displayed along with current attributes.

The invention separately provides printer systems and methods that display only print job exceptions attributes that are different from print job level properties that are determined during job level programming.

In various exemplary embodiments of the printer systems and methods according to the invention, a printer system can be used for displaying and printing a print job, the print job including at least print job level properties and print job exception attributes. The printer system can include a display device that displays the print job, a memory that stores the print job and a controller that controls the print job displayed on the display device to display only the print job exception attributes of the print job that are different from the print job level properties.

In various exemplary alternative embodiments of the printer systems and methods according to the invention, a graphic user interface can be used for displaying a print job and can be used with a printer system. The graphic user interface can include a first window that displays the print job level properties of the print job and a second window that displays only the print job exception attributes of the print job that are different from the print job level properties.

In various exemplary alternative embodiments of the printer systems and methods according to the invention, a method can be used for displaying a print job, the print job including at least print job level properties and print job exception attributes. The method can include the steps of displaying the print job level properties of the print job and displaying only the print job exception attributes of the print job that that are different from the displayed print job level properties.

In various exemplary alternative embodiments of the printer systems and methods according to the invention, the display device can allow a user to navigate by hot-linking from a selected print job exception attribute displayed on a window to another window that allows the user to edit the selected print job exception attribute.

Additional functions, objects, advantages and features of the present invention will become apparent from consideration of the following description and drawings of exemplary embodiments.

BRIEF DESCRIPTION OF THE DRAWINGS

These and other features and advantages of the invention are described in, or are apparent from, the following detailed description of various exemplary embodiments of the systems and methods according to the invention, wherein like numerals reference like elements, and wherein.

DETAILED DESCRIPTION OF PREFERRED EMBODIMENTS

In typical printer systems, a user utilizes printer software to print information, for example, through the use of a computer and a printer. The printer software generally supports print job level programming for selecting properties for an entire print job, i.e., one or several pages to be printed, and that supports programming for print job exception pages attributes for selecting attributes for individual pages that are different print attributes from the properties selected during the job level programming.

Figure 1:
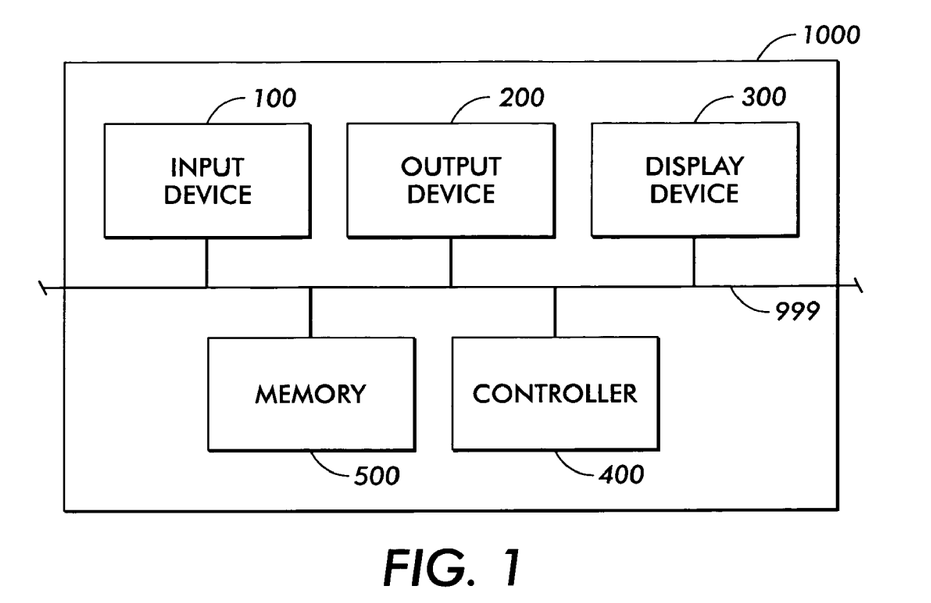
FIG. 1 is an exemplary block diagram of a printer system that can be used with the systems and methods according to the invention.

FIG. 1 shows an exemplary block diagram of a printer system that can be used with the systems and methods according to the invention. The printing system 1000 can include components such as an input device 100, an output device 200, a display 300, a controller 400 and a memory 500. A common bus 999 can interconnect the components.

The input device 100 can be any device which allows a user to input data into the printing system 1000. For example, the input device 100 can be a computer used along with a keyboard, a mouse or a light pen, or a microphone for sending print commands to the printing system 1000.

The output device 200 can be any device that receives print commands from the input device 100 and produces print information, i.e, a printed image of information. For example, the output device 200 can be a printer device that prints an image that represents information that has been processed and output by the printing system 1000.

The display 300 can be any device used to display information that is associated with the printing system 1000. For example, the display 300 can a computer monitor that allows the user to view electronic images of the print information through a windows type operating system so that the user can control the printer system 1000.

The controller 400 controls each of the components of the printing system 1000 so that data can be inputted, processed and output. The controller 400 can be implemented with a general purpose processor. Furthermore, the controller 400 can be implemented using a single special purpose integrated circuit, e.g., ASIC, having a main or central processor section for overall, system-level control and separate sections dedicated to performing various different specific computations, functions and other processes under control of the central processor sections. The controller 400 can be suitably programmed for use with a general purpose computer, e.g., a microprocessor, a microcontroller or other processor device, CPU or NPU, either alone or in conjunction with one or more peripheral, e.g., integrated circuit, data and signal processing devices.

The memory 500 can be any device that stores data or information for the printing system 1000.

Figure 2:
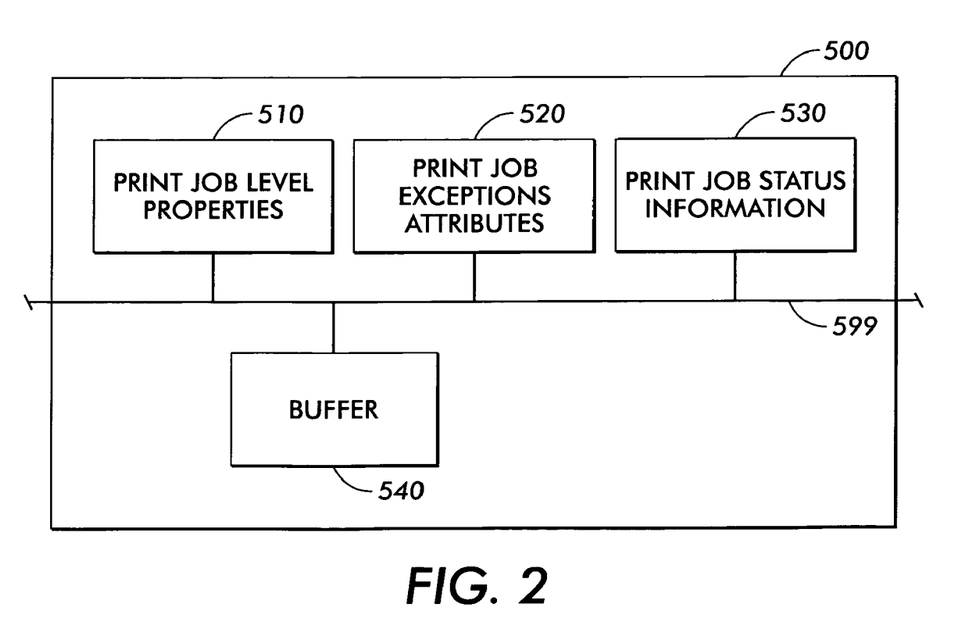
FIG. 2 is an exemplary detailed block diagram of a memory used in the printer system of FIG. 1.

FIG. 2 shows an exemplary detailed block diagram of the memory 500 that can be used with the systems and methods according to the invention. As shown in FIG. 2, the memory 500 can include sections for storing print job level properties 510, a section for storing print job exception attributes 520, a section for storing print job status information 530, and a section for storing printer system data 540. Each component can be interconnected through a common bus 599.

The print job level properties section 510 of the memory 500 can store information such as job identification numbers, queue information, print job name, sender information and submission time information. Furthermore, the print job property level properties section 510 can store any information about print job level programming for selecting properties for an entire print job. For example, if a user selects print job number 63, job level information such as paper stock, printer output, paper color, image shift information, exception pages, inserts, covers, time stamps and PostScript/PDF information can be displayed and selected for print job programming.

The print job exception attributes section 520 of the memory 500 can store information such as an exception page ranges, paper size, paper color, paper drill information, paper type, paper weight information, information regarding which paper sides will be printed, paper side one shift information and paper side two shift information. Moreover, information such as paper stock name, printing sequence, paper sides to be coated, coating type and paper grain type can also be stored. The information stored in the print job exception attributes section 520 is then used to display each of the print job exception attributes on the exception pages when the user decides to display the features. The print job exception attributes can then be amplified using individual window tabs to display, for example, adjustments controls for each of the individual attributes. Although the print job level properties and print job exception attributes are shown for example purposes only, it should be appreciated that the sections for storing print job level properties 520 and print job exception attributes 520 can store any printing property or attribute associated with a printing system.

The print job status information section 530 can store information such as whether the print job is being held by an operator or whether the print job is ineligible for printing. The buffer section 540 can store any print job information related to the operation of the printing system 1000.

Figure 3:
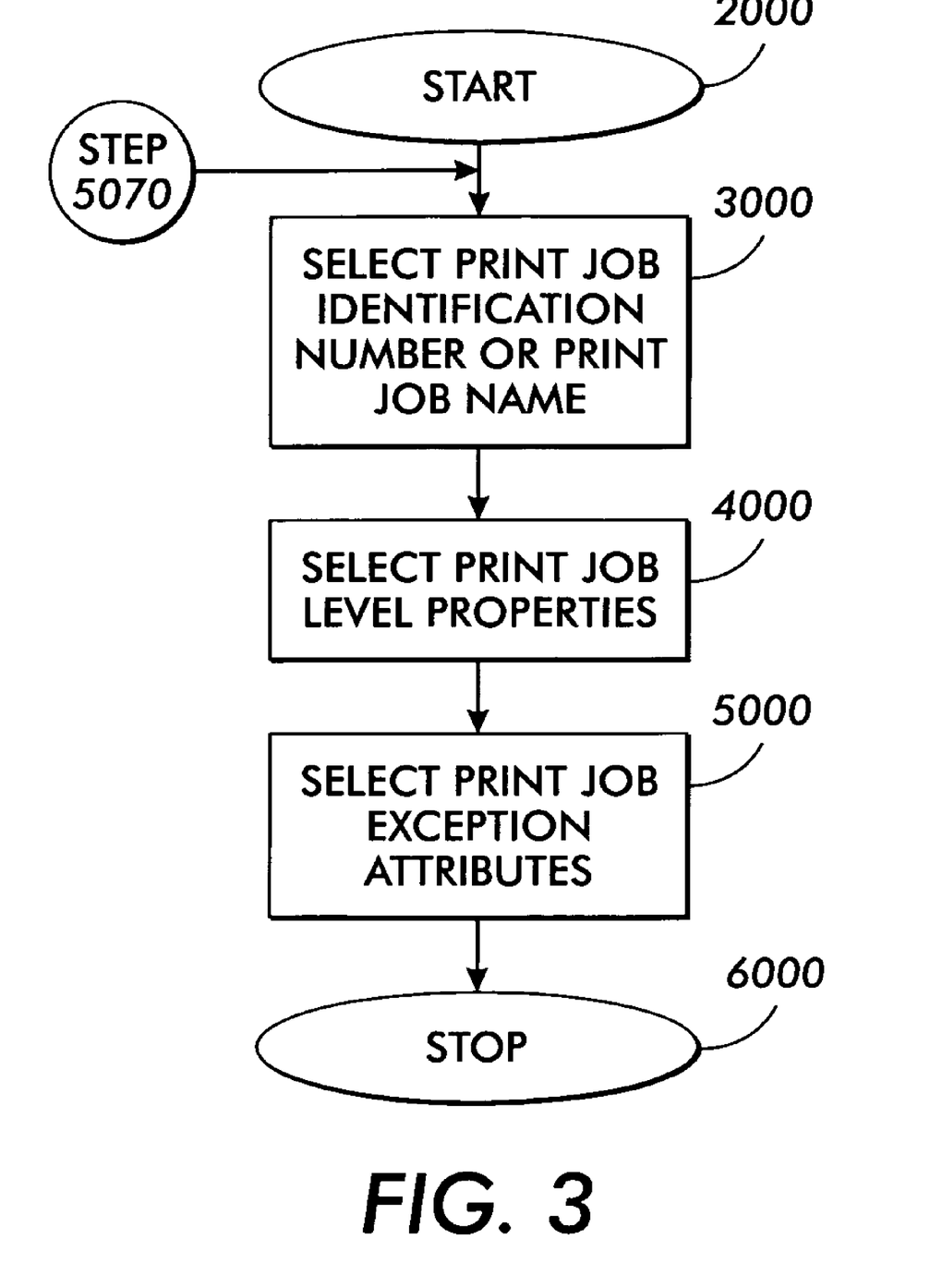
FIG. 3 is an exemplary flowchart providing a method for displaying and selecting print job level properties and print job exception attributes on a user interface according to the systems and methods of the invention.

A method of operating the printer system 1000 by a user to display and select print job exception attributes in accordance with the systems and methods of the invention will now be discussed. FIG. 3 shows an exemplary flowchart for a method for displaying and selecting print job level properties and print job exception attributes for a specific print job. The method shown in FIG. 3 can be used with any printer software that supports programming of print job level properties and print job exception attributes to create "exceptions" to the job level programming that has been performed by the user. The method in FIG. 3 will also be described in relation to a windows user interface 300 shown in FIGS. 5–7. By using the user interface 300, a user can navigate through the printer system to display, control, edit and/or create information related to the printer and the print job.

When it is desired to program the printer system 1000 at the job level and to program print job exceptions attributes, the process in FIG. 3 begins in step 2000. A selection of a print job identification number or name can be made in step 3000 using a "properties" button or by selecting a print job name on a print job manager window 63 that corresponds to a specific print job as shown in FIG. 5.

Figure 5:
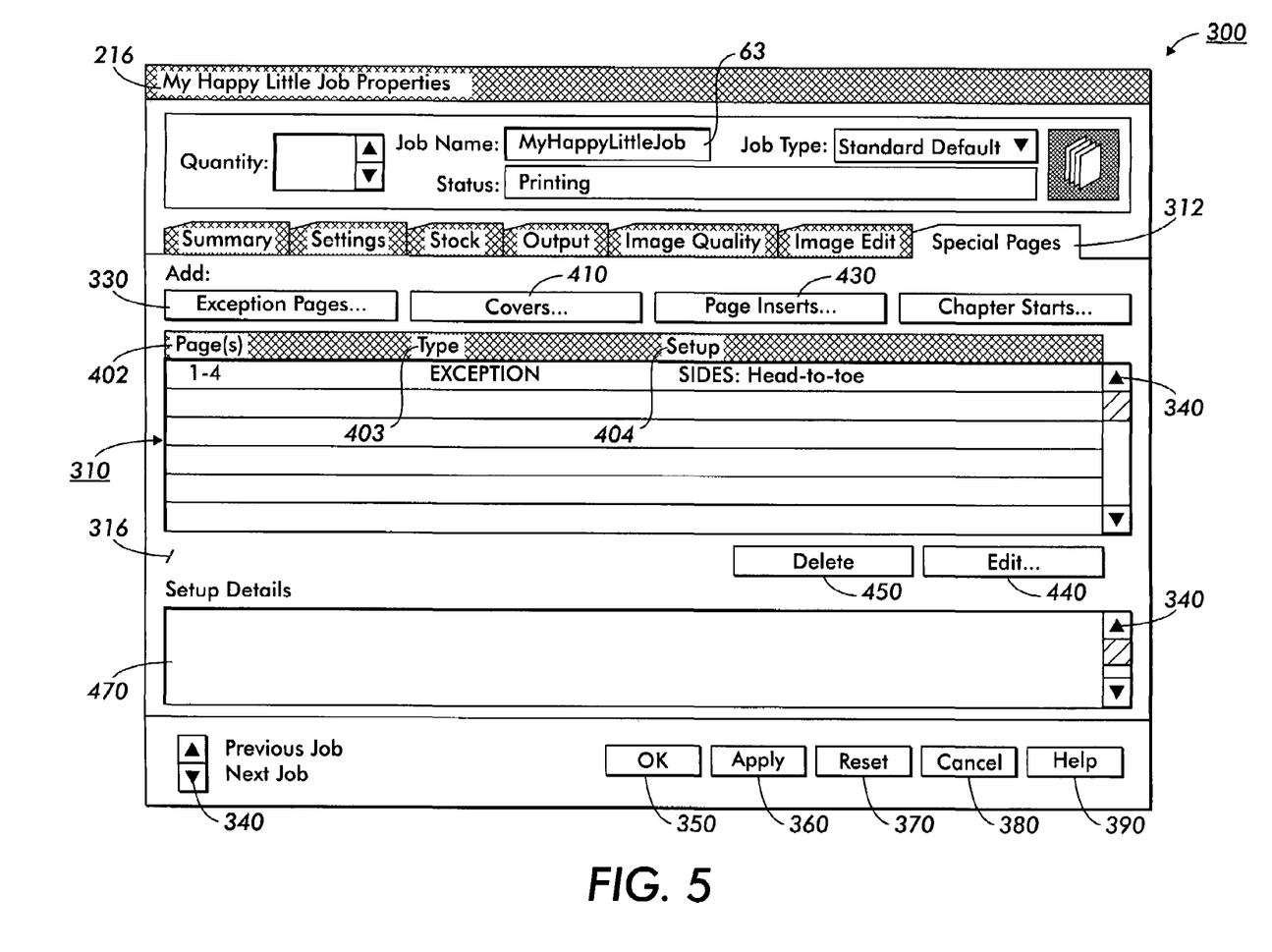
FIG. 5 is an exemplary display showing a print job manager on a user interface that can be used according to the systems and methods of the invention.

FIG. 5 is an exemplary display showing a print job manager on a user interface that can be used according to the systems and methods of the invention. The print job manager window 63 and the user interface 300 shown in FIG. 5 are examples of a window that can be used by the user to manage print jobs. Once a particular print job identification number or print job name is selected in step 3000, the print job level properties window 216 is now displayed that corresponds to the print job identification number or print job name selected in step 3000. After the print job identification number or print job name is selected in step 3000, that print job and associated properties are displayed in the print job level properties window 216. The print job level properties can now be created or edited at the job level in step 4000. These print job level properties will apply to the entire print job that has been selected in step 3000.

Next, after programming the print job level properties in step 3000, a print job exceptions page tab or a special pages tab 312 is selected in step 5000 that is displayed in the print job level properties window 216. The selected tab can then allow a print job exceptions window to be displayed that is still associated with the print job property identification number or name that was previously selected. Then, after starting the process in step 5000, the operation automatically jumps to step 5010 shown in FIG. 4.

Figure 4:
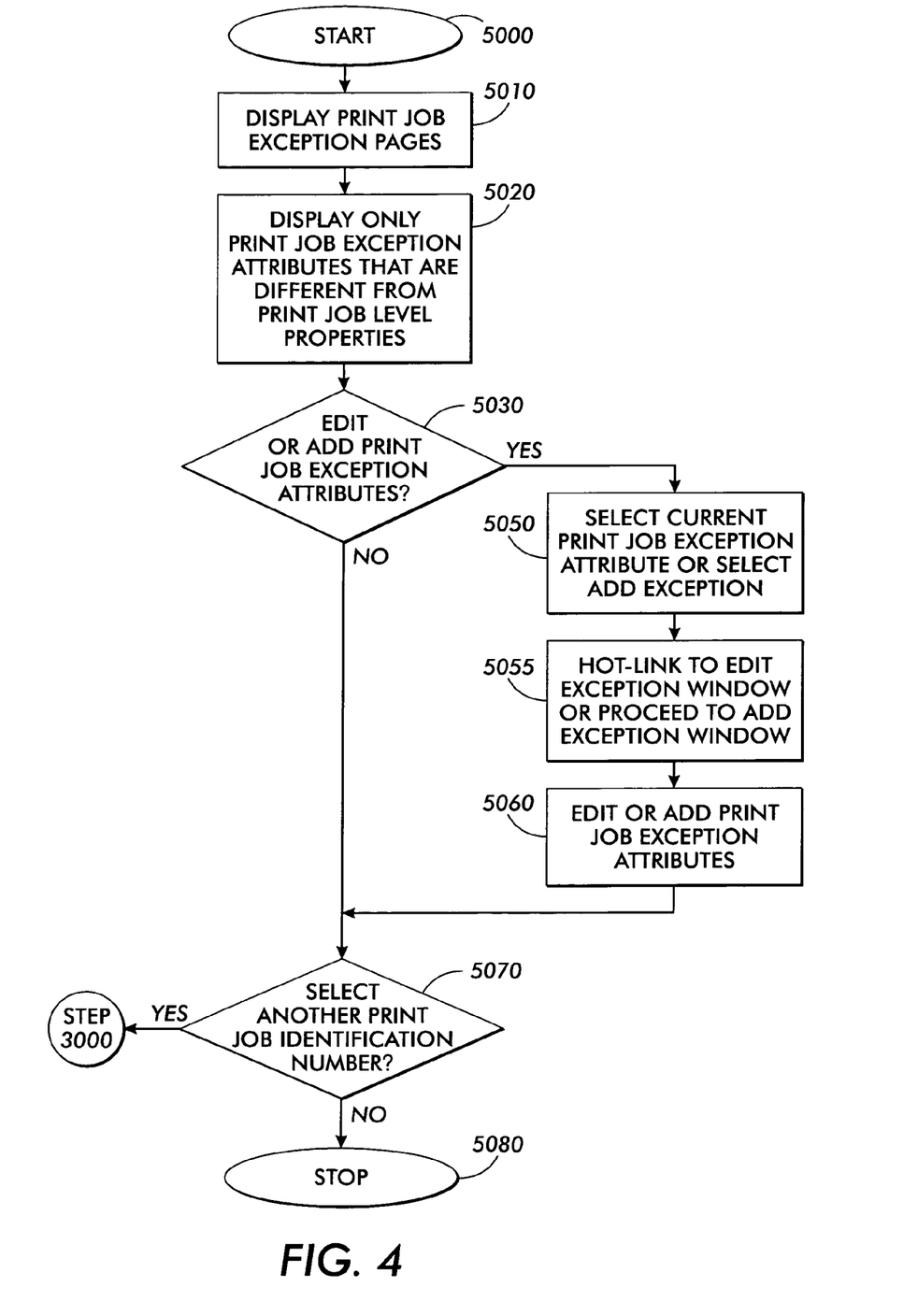
FIG. 4 is an exemplary detailed flowchart providing a method for displaying and selecting print job exception attributes on a user interface according to the systems and methods of the invention.

FIG. 4 is an exemplary detailed flowchart providing a method for displaying and selecting print job exception attributes on a page window according to the systems and methods of the invention. By selecting the print job exceptions page tab 312 (shown in FIG. 5) in step 5000, the operation now displays the print job exceptions page window 310 in step 5010. Then, in step 5020, the operation displays only print job exception attributes that are different that the print job level properties that were defined in step 4000. By displaying only the print job exceptions attributes on the exceptions page window 310 that are different that the print job level properties, the user can improve the management of numerous print job exception attributes displayed on the exception pages in order to increase worker productivity and reduce page level exceptions programming errors. Moreover, by reducing redundant print job exceptions attributes that are already displayed on the print job level properties window, the process eliminates a need for a user to horizontally scroll down a page to summarize the print job exceptions attributes on the exception pages.

The first column 402 in the exceptions page window 310 shown in FIG. 5 can, for example, identify page ranges that will be programmed to include the print job exceptions attributes listed in the another column. Then, the second column 403 can identify the print job exceptions attributes type as being an exception. A third column 404 can be used to show a specific print job exceptions attribute that will be applied to the particular page ranges shown in the first column 402. As previously discussed, only the print job exceptions attributes that are different from the print job level properties programmed at the print job level are displayed on the exception page window 310.

Next, in step 5050, a determination is made whether the user wants to add or modify any print job exceptions attributes. If the user wants to add or modify the print job exceptions attributes, then either a selection is made in step 5050 of a specific print job exceptions attribute that is displayed in the exceptions page window 310 in step 5020, or a selection is made in step 5020 of an "add exceptions" button 330 in the exception page template 316. Then, operation can either "hot-link" in step 5055 from the selected print job exceptions attributes window to an "edit" window that allows editing of the selected print job exception attribute, or proceeds in step 5055 to an "add" window (by selecting the add exception pages button 330) that allows the addition a new print job exception attribute. The hot-link function can be a short-cut navigation control that allows the user to proceed directly to a particular tab to edit a selected print job exceptions attribute.

Then, print job exception attributes can be edited or created as a new attribute in step 5060. Operation then proceeds to step 5070. Otherwise, if the user does not want to add or modify print job exception attributes in step 5030, operation proceeds directly to step 5070, where it is determined whether the user wants to select another print job identification number or print job name in order to display the attributes of another print job exception page. If it is determined in step 5070 that the user wants to display a new exception page attributes window for a different print job, then operation jumps back to step 3000. Otherwise, operation proceeds to step 5080 where the process ends.

It should be appreciated that when a user wants to edit an existing print job exceptions attribute, or add a new print job exceptions attribute, various options can be made available to the user. For example, the user can create a new exceptions page entry by using the "add exceptions" button and specify a page range and program the print job exceptions attributes for the specified page range. Furthermore, the user can edit an existing print job exceptions attribute by selecting the specific attribute displayed in an edit exceptions page window that lists the selected print job exceptions attribute but also lists a corresponding page range as a "read only" attribute. Finally, the user can delete an existing print job exceptions attribute by using a "delete" button. Thus, an add or edit print job exceptions attribute window can have many various features with several different tabs that allow a user to perform various functions.

As partially discussed earlier, FIG. 5 is an exemplary display showing a print job manager on a user interface that can be used according to the systems and methods of the invention. As shown in FIG. 5, an add covers button 410 allows the user to add covers to specific pages in a print job. Moreover, an exception pages button 420 allows the user to add print job exceptions attributes not currently displayed on the exception page window 410 or applied to the selected print job. An add page inserts button 430 allows a user to add page inserts through a print job for organizational purposes. The inserts, for example, can be sheets inserted into output without printing, i.e., no image is applied to the inserted sheet. The inserts can be inserted by a printing system after a fuser and can also be pre-printed pages, e.g., color pages inserted into a black and white print job. These buttons are also shown in the user interface 300 in FIG. 5. An edit button 440 allows the user to edit any current or default print job exceptions attributes that have been set to apply to particular page ranges, and a delete button 450 allows the user to delete any of the current or default print job exceptions attributes. It should be appreciated that the columns labeled in FIGS. 5, 6 and 7 and the print job exception attributes are for example purposes only, and that the columns can be labeled as any name that allows the user to better manage the print job exceptions attributes. Moreover, any print job exceptions attributes can be displayed in the systems and methods according to the invention.

Finally, an additional setup window 470 can be included in this embodiment of the invention. The setup window 470 can be used to expand the details of the print job exceptions attributes listed in each row of the exceptions page window 410. As shown in FIG. 5, the setup window 470 can show a detailed expanded description of the print job exceptions attributes that will be applied to pages 1–4 listed in the exceptions pages window 310.

Figure 6A:
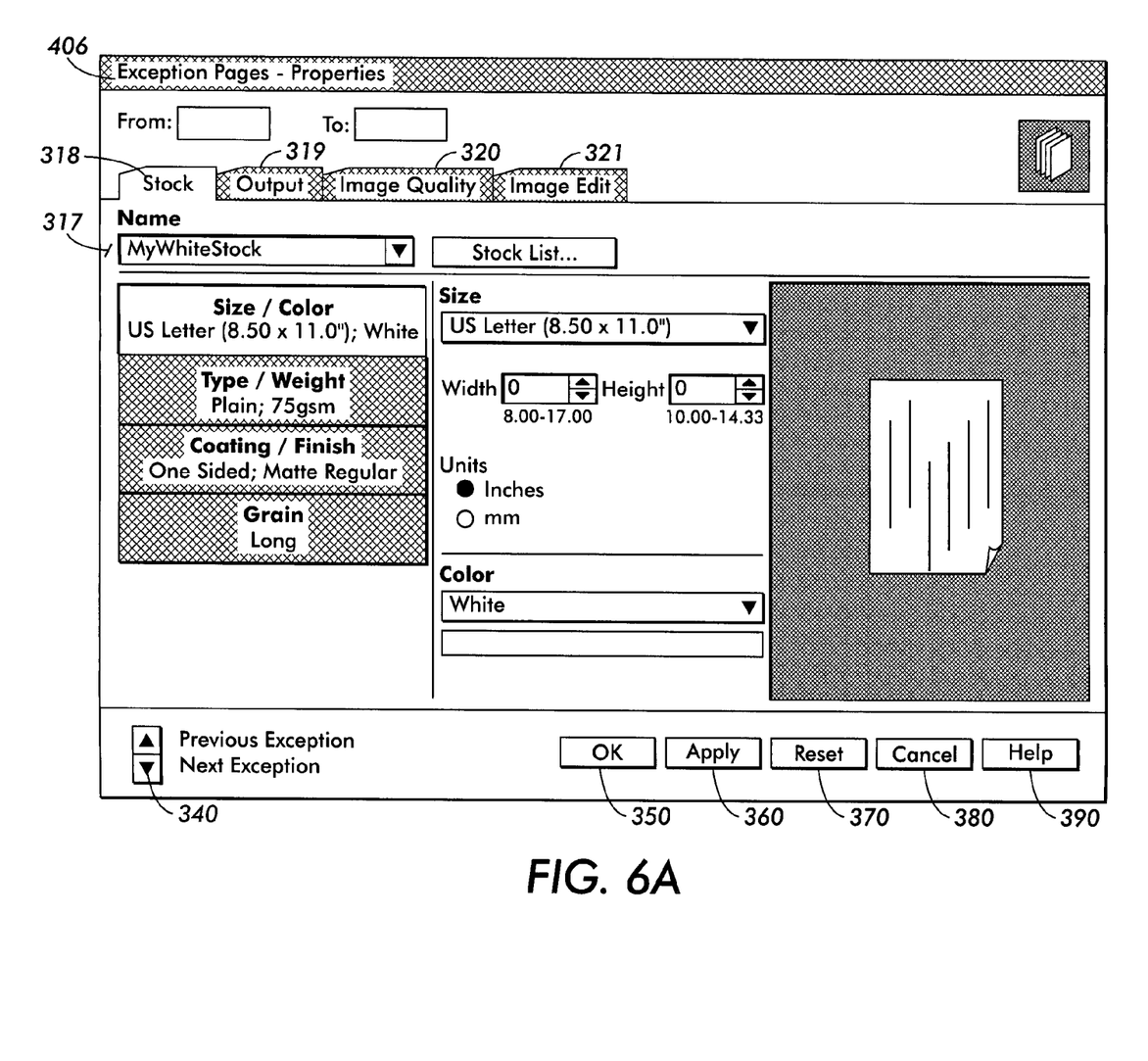
FIGS. 6A–D are exemplary displays showing various print job exception attributes displayed on user interfaces that can be used according to the systems and methods of the invention.
Figure 6B:
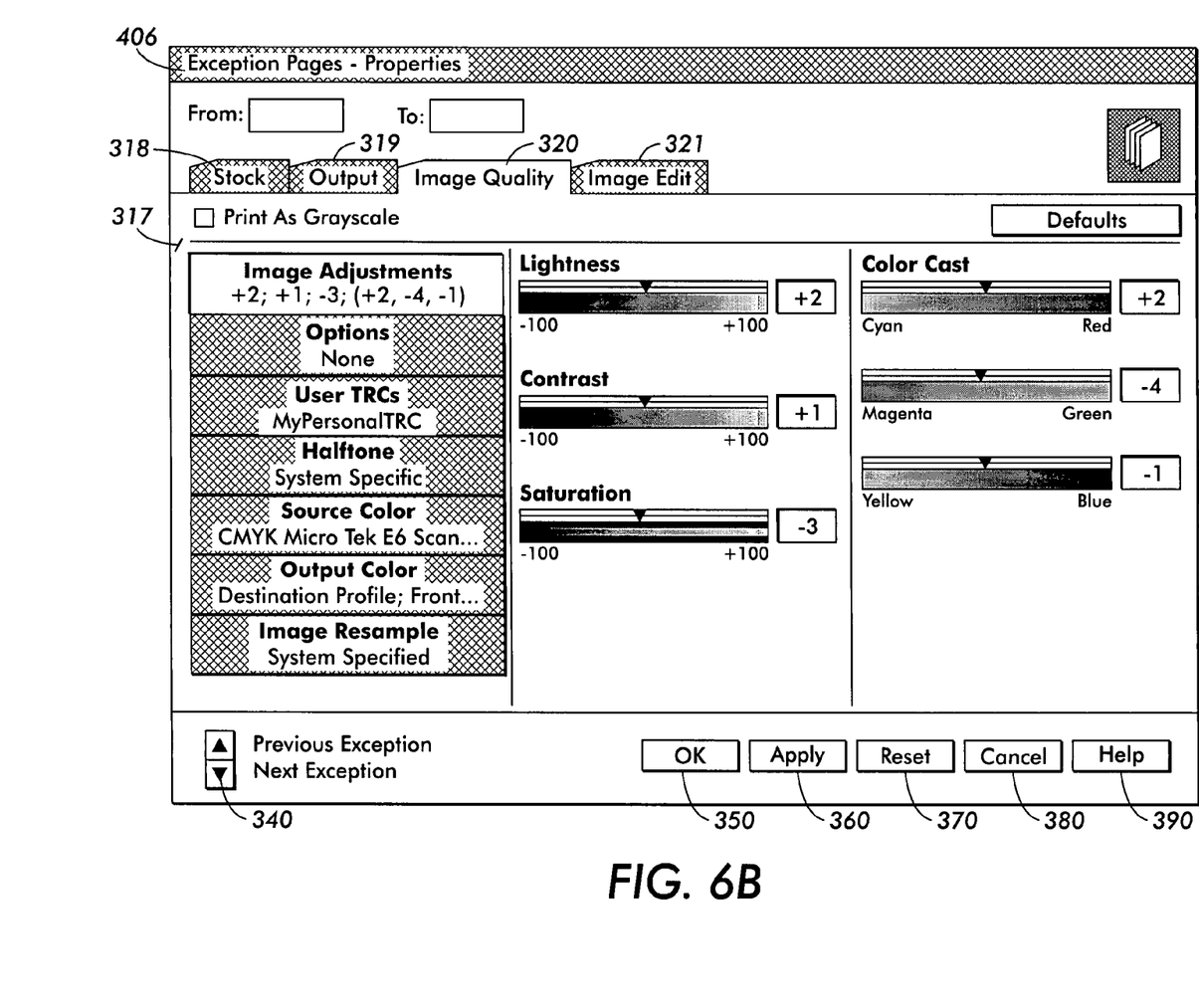
Figure 6C:
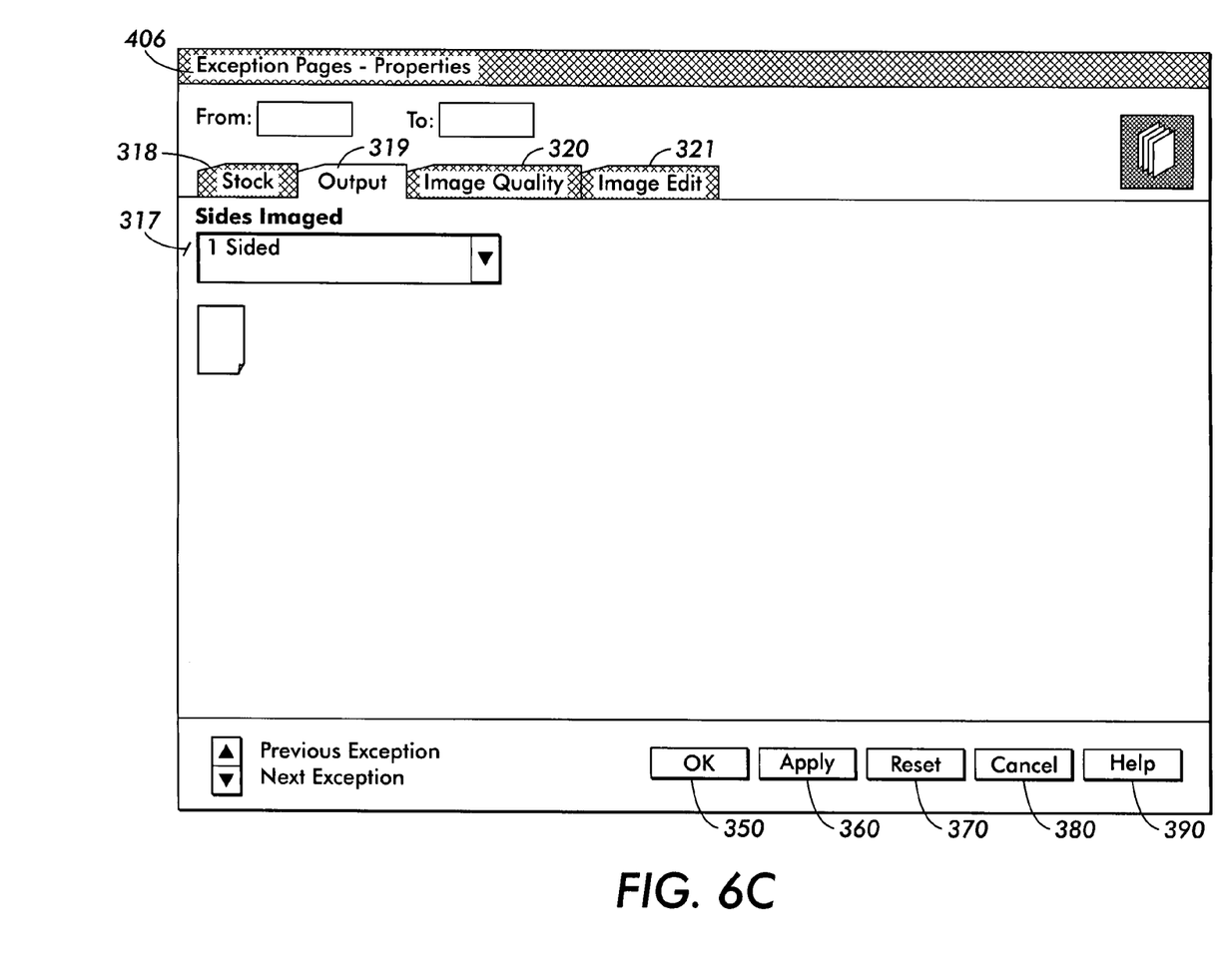
Figure 6D:
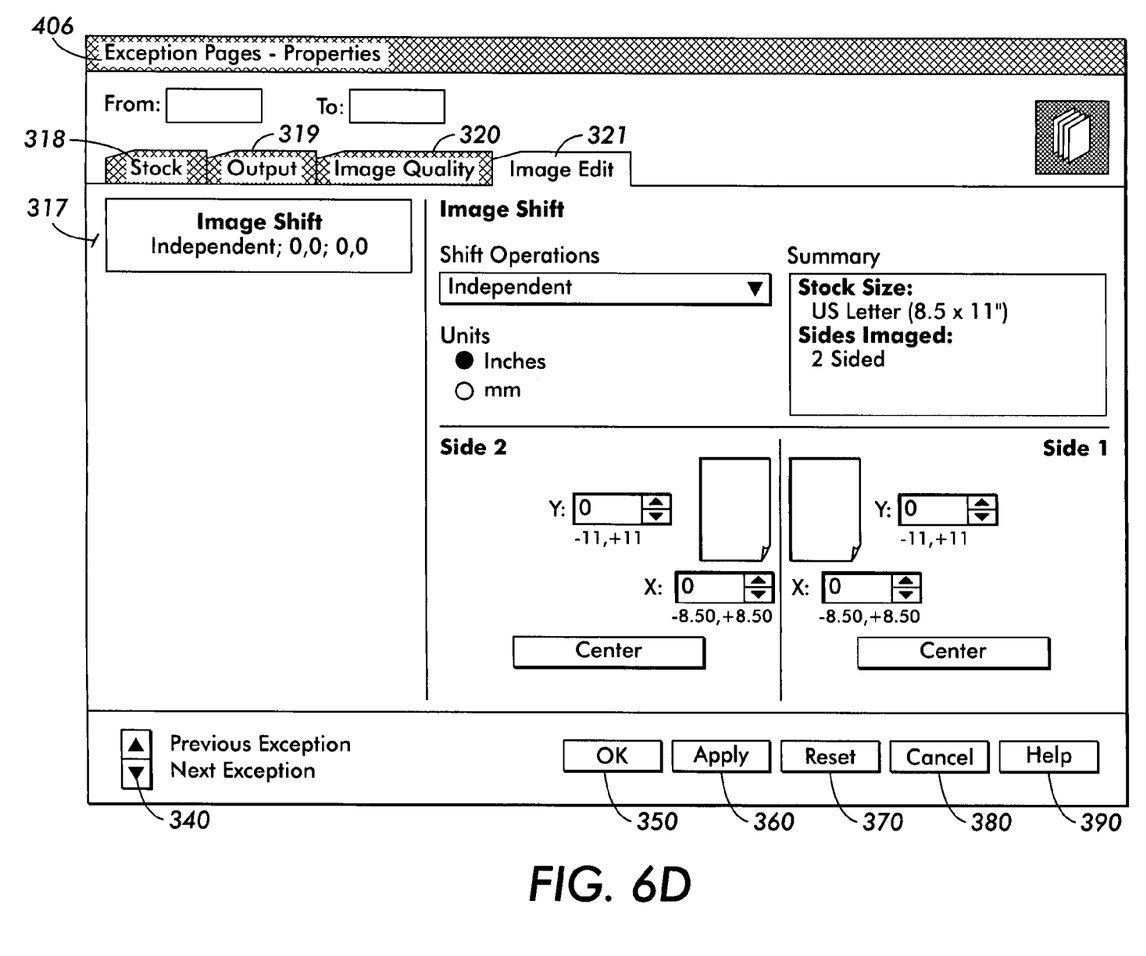

FIGS. 6A–D are exemplary displays of the print job exceptions attributes window 406 that can be used according to the systems and methods of the invention to edit print job exceptions attributes, for example, after hot-linking. As shown in FIG. 6A, a user can access the second exception page template 317 that allows editing of specific print job exceptions attributes by selecting tabs 318–321 on the template 317. The second exception page template 317 can include various tabs with labels that identify the print job exceptions attributes for a selected print job identification number or print job name. For example, the second exception page template 317 in FIG. 6A provides tabs that include attributes such as stock 318, output 319, image quality 310 and image edit 321. In FIG. 6A, the stock tab 318 has been selected to better edit various attributes associated with paper stock like size, color, type, weight, coating, finish and grain. In FIG. 6B, the image quality tab 320 has been selected to better edit various attributes associated with lightness, contrast, saturation and color cast. In FIG. 6C, the output tab 319 has been selected to better edit various attributes associated with the sides of the paper that will be printed. In FIG. 6D, the image edit tab 321 has been selected to better edit various attributes associated with image shifting on paper sides. Although FIGS. 6A–D only show the tabs 318–321 discussed above, it should be appreciated that the second exception page template can show tabs corresponding to any print job exceptions attributes that can be used with a printer system.

The second exception page template 317 can also include various control buttons for controlling each specific exceptions attribute associated with the print job. A toggle button 340, for example, a vertical scroll bar button array, can be used in each window to allow the user to vertically scan each print job and print job exceptions attribute that apply to the page range. Because the exceptions page window 310 only displays the print job exceptions attributes that are different from the print job level properties programmed at the print job level, all of the print job exceptions attributes for a particular print job can be displayed on the exceptions page window 310 without the need for a user to horizontally scroll within the window to display additional attributes. Thus, a horizontal scroll toggle button is not included on the exception page template 316.

Additional buttons can be used in each window to more precisely edit or set particular print job exceptions attributes. For example, an add exceptions button 330 shown in FIG. 5 allows the user to add print job exceptions attributes not currently displayed on the exception page window 310 or not currently being applied to the selected print job. Thus, a user can select the add exceptions button 330 in order to add new print job exceptions attributes that will be programmed and applied to the selected print job. As shown in FIGS. 5–6, an "OK" button 350 enables a user to save editing changes and to close the exception page template 316 window in order to return back to another window. The apply button 360 allows the user to apply the saved editing changes or any modifications to current print job exceptions attributes or apply new print job exceptions attributes that have been added by the user selecting the add exception button 330. Furthermore, the exception page template windows 316 and 317 will be left open and displaying if the apply button 360 is selected. The reset button 370 can allow the user to redisplay the exception page template window 316 and 317 with the last saved print job exceptions attributes. The cancel button 380 allows the user to close the display of the exception page templates 316 and 317 and abandon any editing or modifications that have been programmed. Finally, the help button 390 allows the user to request help on any subject matter regarding the print job exceptions attributes and the exception page window 310.

The list of print job exceptions attributes displayed in the exception page window 310 can be displayed in the same order as preset tabs that list specific properties and attributes when there are multiple categories of print job exceptions attributes. Furthermore, the exception page window 310 can use separate rows for each category of a print job exceptions attribute, for example, using a storyboard.

In accordance with another feature of the invention, the exception page window 310 can be programmed to allow a user to "hot-link" from a selected item on the exception page window 310 to edit the selected print job exception attribute on another window such as exception page templates 316 and 317. By selecting or "clicking" on any of the print job exceptions attributes displayed in the exception page window 310, the user can "hot-link" to an "edit" window that allows editing of the selected print job exception attribute.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A printer system used for displaying and printing a print job, the print job including at least print job level properties and user selectable print job exception attributes, the printer system comprising:
   a display device that displays the print job;
   a memory that stores the print job; and
   a controller that, for every print job, when controlling the display to display the selectable print job exception attributes, controls the print job displayed on the display device to display only the selectable print job exception attributes of the print job that are different from the print job level properties.

2. The printer system according to claim 1, the printer system further comprising a program device for programming the print job level properties at a print job level, and for programming the print job exception attributes.

3. The printer system according to claim 1, further comprising the print job level properties being applied to the print job, and the print job exception attributes being applied to a portion of the print job.

4. The printer system according to claim 1, further comprising the controller controlling the display device to display first and second windows in order for a user to view information about the print job level properties and the print job exception attributes.

5. The printer system according to claim 4, further comprising the second window including a third window that displays information that abbreviates a description of the print job exception attributes, and a fourth window that displays information that expands the description of the print job exception attributes.

6. The printer system according to claim 1, further comprising the controller controlling the display device to allow a user to hot-link from a selected print job exception attribute displayed on a window to a tab located on another window that displays a detailed description of the print job exception attribute.

7. The printer system according to claim 1, further comprising displaying the print job displayed on the display device in a windows format so that the print job exception attributes are displayed on a first window and the print job level properties are displayed on a second window.

8. The printer system according to claim 1, further comprising controlling the print job exception attributes to be entirely displayed on the display device so that a user does not have to horizontally scroll across the display device to view all of the print job exception attributes.

9. A graphic user interface for displaying a print job and used with a printer system, the print job including at least print job level properties and user selectable print job exception attributes, the graphic user interface comprising:
   a first window that displays the print job level properties of the print job;
   a second window that, for every print job, when displaying the selectable print job exception attributes, displays only the selectable print job exception attributes of the print job that are different from the print job level properties.

10. The graphic user interface according to claim 9, further comprising the second window allowing a user to program the print job level properties at a print job level, and to program the print job exception attributes of the print job.

11. The graphic user interface according to claim 9, further comprising the print job level properties being programmed to be applied to the print job, and the print job exception attributes being programmed to be applied to a portion of the print job.

12. The graphic user interface according to claim 9, further comprising displaying the first window and the second window in order for a user to view information about the print job level properties and the print job exception attributes.

13. The graphic user interface according to claim 12, further comprising the second window including a third window that displays information that abbreviates a description of the print job exception attributes, and a fourth window that displays information that expands the description of the print job exception attributes.

14. The graphic user interface according to claim 9, further comprising the second window allowing a user to hot-link from a selected print job exception attribute displayed on the second window to a print job level property located on the first window.

15. The graphic user interface according to claim 9, further comprising the print job exception attributes being entirely displayed on the second window so that a user does not have to horizontally scroll across the second window to view all of the print job exception attributes.

16. A method for displaying a print job and used with a printer system, the print job including at least print job level properties and user selectable print job exception attributes, the method comprising:
   displaying the print job level properties of the print job; and
   for every print job, when displaying the selectable print job exception attributes, displaying only the selectable print job exception attributes of the print job that that are different from the displayed print job level properties.

17. The method for displaying a print job of claim 16, further comprising displaying the print job level properties on a first window and displaying the print job exception attributes on a second window.

18. The method for displaying a print job of claim 16, further comprising programming the print job level properties to be applied to the print job, and the print job exception attributes to be applied to a portion of the print job.

19. The method for displaying a print job of claim 16, further comprising displaying a second window that includes a third window that displays information that abbreviates a description of the print job exception attributes, and a fourth window that displays information that expands the description of the print job exception attributes.

20. The method for displaying a print job of claim 16, further comprising hot-linking from a selected print job exception attribute displayed on a second window to a tab located on another window that displays a detailed description of the print job exception attribute.

* * * * *